United States Patent Office 3,154,624
Patented Oct. 27, 1964

3,154,624
RAMMING MIX
James L. Dolph and Albert L. Renkey, Pittsburgh, Pa., assignors to Harbison-Walker Refractories Company, Pittsburgh, Pa., a corporation of Pennsylvania
No Drawing. Filed Feb. 21, 1962, Ser. No. 174,704
11 Claims. (Cl. 13—35)

This invention relates to ramming mixes and more particularly to ramming mixes suitable for fabrication of monolithic refractory structures for induction furnaces used in treating aluminum.

Conventionally, induction furnaces include a primary or furnace coil and a secondary which is a pool or bath of molten metal. A high frequency alternating current is applied to the primary coil and a current is induced thereby in the secondary. This induced current causes rapid heating in the metal due to the resistance thereof and resultant melting of the charge.

In such an induction furnace the primary or induction coils are separated from the molten metal bath by a relatively thin (usually 1 to 2½"), and necessarily fluid, impervious layer of refractory materials. The selected refractory material desirably withstands corrosion and penetration by the fluid or molten aluminum over extended periods of time since penetration by the molten aluminum and contact with the primary or induction coils leads to a short circuit and shutdown of the unit.

Conventionally refractory materials are available in preformed shapes which are laid up with mortar to form a furnace lining, and also in the form of unconsolidated materials capable of being tempered with water and rammed or gunned into a form to provide a monolithic structure. In using preformed shapes in aluminum induction furnaces, not only is the cost of the necessary plurality of varying configurations economically prohibitive, but the joints between the shapes present areas more susceptible to metal penetration thus increasing the possibility of short circuiting the induction coils. Thus, ramming mixes which may be rammed into place to form a unitary and much stronger, dimensionally stable refractory mass substantially free of weak points are preferable in aluminum induction furnaces.

Various known refractory materials have been used in compounding ramming mixes for induction furnaces which, while satisfactory in some respects, have not proved entirely suitable with molten aluminum which has characteristics of a very powerful reducing agent.

Further, it is desirable that a selected ramming mix have the ability to form a strong and coherent mass using simple ramming techniques. Some exotic mixtures have been suggested which meet most of the foregoing requirements but expense has lessened their commercial feasibility.

Accordingly, it is an object of this invention to provide improved ramming mixes; which are particularly suitable for aluminum induction furnaces; which are readily workable in a conventional ramming procedure; which are essentially inert to chemical reduction by molten aluminum and which resist wetting by molten aluminum and its alloys.

Another object of the invention is to provide an improved ramming mix for aluminum induction furnaces which resists spalling and popping of the lining upon heating, is fabricated of commercially available materials, has a minimum of volume change over operating conditions; and which can be installed as the lining for an induction furnace using presently known techniques.

Briefly, in one embodiment according to the concepts of this invention, a substantially semi-dry ramming mix is provided having excellent resistance to attack and penetration by molten aluminum. It is comprised of a mix of commercially available refractory aggregate and a relatively pure mixture of calcium aluminates. The mix is substantially free of free or unreacted calcium oxide or lime, and has very low iron and iron oxide content. In a preferred mix, by weight, about 80 parts of calcined alumina is combined with about 20 parts of a substantially pure mixture of calcium aluminates and about 6 parts of water.

Other objects and further features and advantages of ramming mixes according to the concepts of this invention will become readily apparent to those skilled in the art from a study of the following detailed description of experimental work which is presented by way of explanation and not by way of limitation.

In the following examples a mixture of chrome ore or calcined alumina was used as the refractory aggregate. A typical analysis of the calcined alumina, chrome ore, and the mixture of calcium aluminates utilized in the following discussion is as follows (on an oxide basis):

|  | Calcined Alumina, percent | Chrome Ore, percent | Calcium Aluminate, percent |
|---|---|---|---|
| $Al_2O_3$ | 99.4 | 29.2 | 50.8 |
| $SiO_2$ | 0.3 | 5.5 | 5.8 |
| $Cr_2O_3$ |  | 32.1 |  |
| $MgO$ |  | 18.8 | 1.4 |
| $Fe_2O_3$ | 0.2 | 12.6(FeO) | 1.3 |
| Loss |  | 1.0 |  |
| Free Lime (CaO) |  |  |  |
| Combined Lime |  | 0.6 | 39.8 |
| Alkalies | 0.1 |  | 0.2 |

The refractory aggregates selected, such as the calcined alumina or chrome ore above discussed, are carefully prepared and mixed with the mixture of calcium aluminates to obtain a screen analysis as listed below:

| | Percent |
|---|---|
| −4+10 mesh | 25 |
| −10+28 mesh | 22 |
| −28+65 mesh | 15 |
| −65 mesh | 38 |

In this mix the mixture of calcium aluminates is substantially all reduced to finer than 100 mesh (Tyler).

In the laboratory, sufficient water was added to an aggregate mixture of calcium aluminates dry mix to provide the desired ramming mix consistency, thoroughly blended into a test batch, and formed into test pieces measuring 9 x 4½ x 2½". The test pieces were air rammed followed by air drying at 230° F. for sixteen hours.

The aluminum alloy 7075 used in the above tests contains 5.5% zinc, 2.5% magnesium, and 1.5% copper. The test specimens measured 2 x 2 x 2½", were cut from the 9 x 4½ x 2½" test pieces above mentioned and were immersed for one-half their respective 2½ inch dimension to obtain results as to relative penetration. The specimens were cut in half longitudinally after removal from the bath. Such a test simulates attack at the metal line where refractory destruction is most severe.

The following table sets forth the relative composition of five mixes and the results of tests undertaken with them.

*Table I*

| Mix Number | 1 | 2 | 3 | 4 | 5 |
|---|---|---|---|---|---|
| Composition: | | | | | |
| Calcined Alumina_____percent__ | 90 | 90 | 80 | 70 | 60 |
| Calcium Aluminate_____do____ | | 10 | 20 | 30 | 40 |
| Plastic Clay_____do____ | 10 | | | | |
| Water (added)_____do____ | 6 | 6 | 6 | 7 | 8 |
| Density (p.c.f.): | | | | | |
| Dried at 230° F_____ | 176 | 174 | 172 | 168 | 164 |
| Fired at 1500° F_____ | 174 | 169 | 166 | 161 | 157 |

In the refractory art, the mixture of calcium aluminates of this invention is sometimes termed "calcium aluminate" but, chemically speaking, this is inaccurate. The phase diagram for these commercially available materials indicates them to be about 75 to 80% of various structural forms and combinations of calcium, aluminum and oxygen, the remaining 25 or 20% is made up of various Ca-Al-$O_2$-Si combinations and subcombinations, minor portions of heavy metals, silica, minor portions of iron oxides, and trace impurities. While this invention uses such a relatively inexpensive commercially available material it also uses substantially pure (99+% purity) "calcium aluminate," and other materials in the intermediate ranges of purity i.e. 75–99+% purity. In the following discussion, the term "calcium aluminate" is used for purposes of simplicity of explanation. In the following discussion of test results the term refers to the previously set forth chemical analysis on an oxide basis.

In the test of the body resulting from Mix 1, aluminum metal firmly attached to the specimen surface and was observed to have penetrated and reacted with the refractory material to a depth of ⅜ of an inch. In Mix 2, 10% by weight of calcium aluminate was substituted for the plastic clay of Mix 1. The resulting body was subjected to a similar test and aluminum metal was observed to have partially adhered to the specimen's surface with only trace reaction between the metal and refractory. With the test bodies of Mixes 3, 4 and 5, aluminum metal was observed as a surface coating but was readily peeled therefrom and the exposed refractory surface was substantially uncorroded and exhibited no reaction with the molten metal.

These test results illustrate the property of calcium aluminate as a molten aluminum repellent. Additionally, the calcium aluminate acts as a plasticizer in the mix and supplies the physical fines necessary for best compaction.

From the foregoing it will be seen that from 10 to 40% by weight of calcium aluminate, with the remainder a refractory aggregate, provides the needed density, dimensional stability and resistance to attack by molten aluminum. Mix 3 is exemplary of the preferred 20% calcium aluminate (75 to 80% purity) to 80% aggregate mix and economically provides the most favorable combination of properties desired. When advisable, minor quantities of plasticizers, such as fire clay, and chemical regulators may be added. In some instances it may be desirable to include other aggregate material such as magnesite, zirconia, olivine, calcined bauxite, and the like.

In Table II, natural chrome ore constitutes the refractory aggregate which was combined with calcium aluminate similar to that utilized in the mixes of Table I in the graded size range above mentioned.

*Table II*

| Mix Number | 6 | 7 |
|---|---|---|
| Composition: | | |
| Philippine Chrome Ore_____percent__ | 80 | 70 |
| Calcium Aluminate_____do____ | 20 | 30 |
| Water added_____do____ | 7 | 7 |
| Density (p.c.f.): | | |
| Dried at 230° F_____ | 184 | 174 |
| Fired at 1500° F_____ | 177 | 165 |

The test specimens made from Mixes 6 and 7, upon removal from the molten aluminum bath, had a metal coating. The metal coating was easily peeled from the specimen surface and upon dissection no penetration or reaction with the aluminum metal was indicated.

More than about 40% of the calcium aluminate results in a mix which is subject to shrinkage and cracking at the operating temperatures used in aluminum induction furnace. Shrinkage and cracking of the refractory in this service is intolerable because it permits the molten metal to penetrate to the coils and short out the furnace. Mixes 2 through 7 of the invention have been tested for dimensional stability at 1500° F. and linear shrinkage has been found to be negligible.

The calcium aluminate used in ramming mixes according to the teachings of the instant invention may be secured from any of various commercial sources. They may be obtained as the more or less useless by-product of several commercial processes, such as that producing phosphate fertilizer from apatite. However, care must be exercised as to which commercial process by-products are utilized since the calcium aluminate must be substantially free of free or unreacted calcium oxide or lime. Any substantial degree of free calcium oxide adulteration subjects the mix to hydration expansion upon contact with the water which is used to temper the mix to a ramming consistency. Likewise the calcium aluminate utilized must be substantially free of iron or iron oxide which has a tendency to be attacked by molten aluminum.

As noted above, the calcium aluminate is finely divided and preferably finer than about 100 mesh but minor quantities of larger mesh size particles, while lessening the effectiveness of the calcium aluminate addition, may be successfully used. Some commercially available hydraulic cements having the above properties and parts analysis may be utilized. But in any event, the selected calcium aluminate should have less than about 25% by weight of impurities in addition to the other prerequisites above noted. Of course, the greater the purity and higher the concentration of the mixture of calcium aluminates above noted, the better the refractory structure resulting.

In the actual fabrication of an aluminum induction furnace with a mix according to the concepts of this invention a tabular alumina aggregate was used, mixed with water and with calcium aluminate in a graded size range and proportions as described above. The material was rammed into a form and allowed to air dry for about thirty hours. Damp bags were placed about the rammed mix to insure uniformity of curing. The furnace was then raised to 1400° F. in intervals of about 100° per hour in order to assure very slow drying and evolution of the tempering fluid. In some instances it is desirable to regulate the temperature rise to extend over a forty hour period in order to assure slow evolution of moisture and to prevent burning out of the induction coils.

Various commercial installations of aluminum induction furnaces according to this invention have been operating over extended periods of time and have resulted in increased lining life on an average of from 10 to 20% over those previously available. In some instances, a refractory insulation constructed of a mix according to the instant invention was the first to obtain a satisfactory installation which would function for its intended purpose.

Having thus described the invention in detail and with sufficient particularity as to enable those skilled in the art to practice it what is desired to have protected by Letters Patent is set forth in the following claims.

We claim:
1. An aluminum induction furnace including a primary coil separated from a molten metal confining cavity by a thin layer of refractory, said refractory consisting of a batch of a refractory aggregate in a brickmaking graded size range and finely divided commercial calcium aluminate, said commercial calcium aluminate being substantially free of iron oxide and containing at least about 75% of calcium aluminate compounds, said batch being substantially free of free lime and comprised of about 90 to 60% refractory aggregate and about 10 to 40% calcium aluminate, by weight.

2. The aluminum induction furnace of claim 1 in which the refractory aggregate is calcined alumina.

3. The aluminum induction furnace of claim 1 in which the refractory aggregate is chrome ore.

4. An aluminum induction furnace including a primary coil separated from a molten metal confining cavity by a thin layer of refractory, said refractory consisting of a mixture of a refractory aggregate and commercial calcium aluminate, said mixture being in a graded size range of from about +10 to −65 mesh, and in which substantially all of the calcium aluminate is reduced to finer than about substantially 100 mesh, said calcium aluminate being substantially free of iron oxide and containing no more than about 25% of materials other than calcium aluminate compounds, said mixture being substantially free of free lime and comprised of about 90 to 60% refractory aggregate and about 10 to 40% calcium aluminate, by weight.

5. The method of fabricating a monolithic refractory lining for an aluminum induction furnace which includes a furnace coil, which comprises the steps of erecting mold forms to define a cavity about the coil, combining a mixture consisting of a refractory aggregate selected from the group consisting of calcined alumina and chrome ore, and commercial calcium aluminate, said commercial calcium aluminate being substantially free of iron oxide and containing no more than about 25% of material other than calcium aluminate compounds, the mixture being substantially free of free lime and comprised of about 90 to 60% of the refractory aggregate and about 10 to 40% of the calcium aluminate, by weight, and sufficient water to obtain a ramming consistency, ramming said mixture in said mold forms to fill said cavity and form a thin layer of refractory material over the coil, removing the mold forms, slowly heating the resulting body and raising the temperature thereof to about 1400° F. whereby to assure very slow drying and evolution of moisture to prevent cracking of the body.

6. The method of fabricating a monolithic refractory lining for an aluminum induction furnace which includes a furnace coil, which comprises the steps of erecting a form to define a cavity about the coil, combining a mixture consisting of a refractory aggregate selected from the group consisting of calcined alumina and chrome ore, and commercial calcium aluminate, said commercial calcium aluminate being substantially free of iron oxide and containing no more than about 25% of material other than calcium aluminate compounds, the mixture being about 90 to 60% of the refractory aggregate and about 10 to 40% of the calcium aluminate, by weight, and sufficient water to obtain a ramming consistency, ramming said mixture in said form to fill said cavity and form a thin layer of refractory material over the coil, removing the mold forms, allowing the resulting body to air dry for about 30 hours while inducing sufficient uniformity of cross sectional moisture content as to obtain uniformity of drying, heating the body by raising the temperature thereof to about 1400° F. whereby to assure very slow drying and evolution of moisture to prevent cracking of the body.

7. In aluminum induction furnaces which include a primary coil separated from their molten metal confining cavity by a thin layer of refractory, the improvement which comprises fabricating said layer of refractory by ramming a size graded batch about the coil, said batch consisting essentially of a mixture of a refractory aggregate in a brickmaking graded size range of finely divided 75 to 80% pure commercial calcium aluminate, said commercial calcium aluminate being substantially free of iron oxide and containing no more than about 25% of material other than calcium aluminate compounds, said mixture being about 90 to 60% aggregate and about 10 to 40% calcium aluminate, by weight, and sufficient water to obtain a semi-dry ramming consistency.

8. An aluminum induction furnace including a primary coil separated from a molten metal confining cavity by a thin refractory layer consisting essentially of a mixture of coarsely size graded tabular alumina aggregate and a finely divided calcium aluminate material, said calcium aluminate material being substantially free of iron oxide and containing at least about 75% of calcium aluminate compounds in the weight ratio of about 80 parts to 20 parts, the mixture being substantially free of free lime.

9. An aluminum induction furnace including a primary coil separated from a molten metal confining cavity by a thin layer of refractory material, said refractory material consisting essentially of a size graded refractory batch mixture, including coarsely size graded calcined alumina, and finely divided calcium aluminate, said calcium aluminate being substantially free of iron oxide and containing no more than about 75% of material other than calcium aluminate compounds, said mixture being substantially free of lime, the weight ratio of $Al_2O_3$ to $CaO$ in said calcium aluminate, on the basis of an oxide analysis, being on the order of 1.3:1, said mixture comprised of about 90 to 60% by weight of calcined alumina and about 10 to 40% by weight of calcium aluminate.

10. The aluminum induction furnace of claim 8 in which the calcium aluminate is substantially all −100 mesh and the calcined alumina is graded to range in size from about +10 mesh to about −65 mesh.

11. The method of fabricating a monolithic refractory lining over the furnace coil of an aluminum induction furnace, which lining is characterized by resistance to wetting by and reaction with molten aluminum, and comprising the steps of:
(A) erecting form means about the furnace coil to define a space in which the coil is positioned:
  (i) the spacing being of sufficient cross-sectional dimension to allow subsequent formation of a layer of refractory material over the inner-face of the furnace coil,
  (ii) said layer having a useful thickness on the order of about 1 to about 2½ inches;
(B) forming a refractory batch mixture:
  (i) of a coarser size graded material selected from the group consisting of chrome ore and calcined alumina, and finely divided calcium aluminate,
  (ii) the coarser material constituting about 90 to 60% by weight of the mixture, and the calcium aluminate constituting about 1 to 40% by weight of the mixture,
  (iii) the calcium aluminate being substantially all −100 mesh and the coarser material graded to range in size from about +10 to about −65 mesh, said calcium aluminate being substantially free of iron oxide and containing at least about 75% of calcium aluminate compounds,
  (iv) the total batch mixture being substantially free of free lime;
(C) adding sufficient tempering fluid to the batch mixture to obtain a ramming consistency:
(D) ramming the tempered mixture in the space defined by said form means to form a layer of refractory material over the innerface of the coil:
(E) removing the form means:
(F) allowing the resulting rammed refractory material to air dry:
  (i) for about 30 hours,
  (ii) while inducing sufficient uniformity of cross-sectional moisture content as to obtain uniformity of drying;
(G) heating the air dried refractory material to a temperature:
  (i) of about 1400° F.,
  (ii) in intervals of about 100° F. per hour;

whereby to assure very slow drying, and evolution of moisture from the refractory material and to obtain a monolithic refractory lining for said furnace in which said coil is embedded.

References Cited by the Examiner
UNITED STATES PATENTS

| | | | |
|---|---|---|---|
| 1,871,159 | 8/32 | Davis et al. | 13—35 |
| 2,008,732 | 7/35 | Summey | 13—30 |
| 2,407,135 | 9/46 | Clark | 106—64 |
| 2,912,341 | 11/59 | Ricker | 106—64 |

OTHER REFERENCES

"Chemistry of Cement and Concrete," Lea and Desch, 1956, page 445.

RICHARD M. WOOD, *Primary Examiner.*

JOHN H. MACK, JOSEPH V. TRUHE, *Examiners.*

UNITED STATES PATENT OFFICE
CERTIFICATE OF CORRECTION

Patent No. 3,154,624　　　　　　　　　　　　　　October 27, 1964

James L. Dolph et al.

It is hereby certified that error appears in the above numbered patent requiring correction and that the said Letters Patent should read as corrected below.

Column 6, line 50, for "1 to 40%" read -- 10 to 40% --.

Signed and sealed this 10th day of August 1965.

(SEAL)
Attest:

ERNEST W. SWIDER
Attesting Officer

EDWARD J. BRENNER
Commissioner of Patents